July 22, 1924.  
W. L. STEVENS  
BEE TRAP  
Filed April 12, 1923
1,502,273
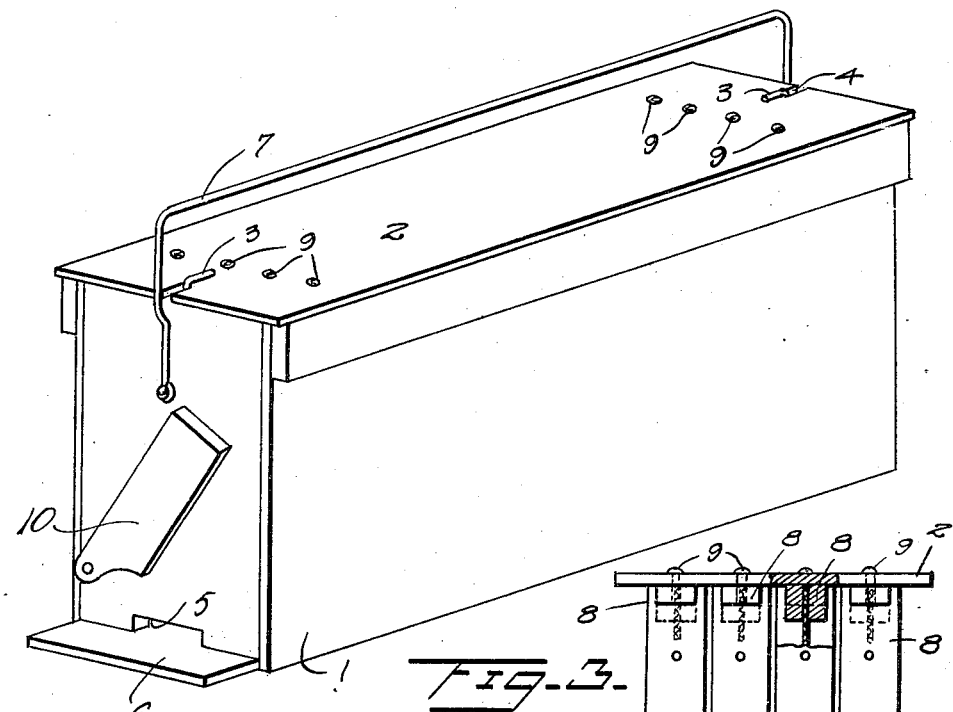
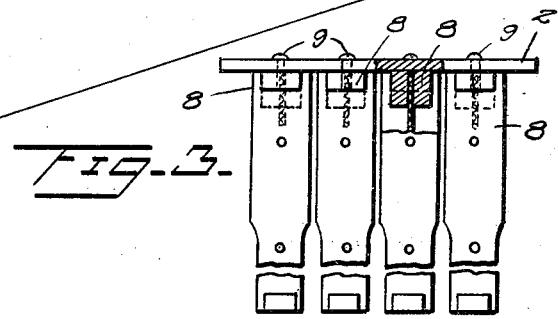
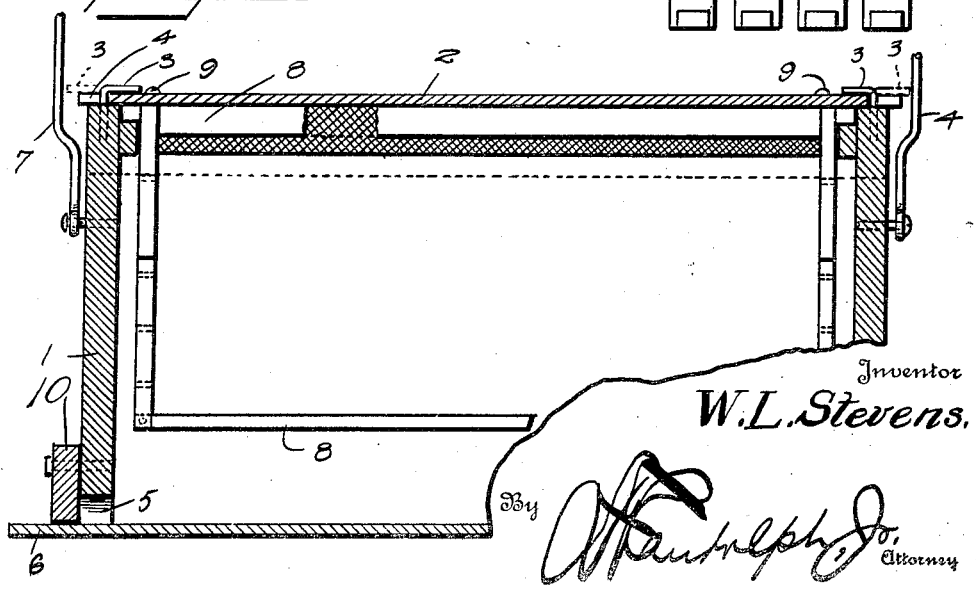
Inventor  
W. L. Stevens,  
By ........  
Attorney Patented July 22, 1924.

1,502,278

UNITED STATES PATENT OFFICE.

WILLIAM L. STEVENS, OF ELGIN, NEBRASKA.

BEE TRAP.

Application filed April 12, 1923. Serial No. 631,627.

*To all whom it may concern:*

Be it known that I, WILLIAM L. STEVENS, a citizen of the United States, residing at Elgin, in the county of Antelope and State of Nebraska, have invented certain new and useful Improvements in Bee Traps; and I do hereby declare the following to be a full, clear, and exact description of the invention, such as will enable others skilled in the art to which it appertains to make and use the same.

In the bee industry it is common for the bees at times to leave the hive and swarm in trees and at such times the apiarist is confronted with a problem to collect and return the wandering bees to the hive or apiary.

Therefore, the invention has for its object the provision of a trap which may be suspended in a tree or otherwise placed to collect the bees and subsequently transfer the same to the hive.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a bee trap embodying the invention,

Figure 2 is a longitudinal sectional view of the trap, and of the cover and frame and Figure 3 is an end elevation, partly in section of the cover and frame removed from the box.

Corresponding and like parts are referred to in the following description and designated in the views of the drawings by like reference characters.

The body of the trap comprises a box 1 which may be of any dimensions and which is closed at the top by means of a removable cover 2 which is held in position by suitable fastenings 3 pivotally engaging the box and having their upper ends bent backwardly to engage the cover, the latter being provided with open slots 4 to provide clearance for the bent ends of the fastenings when it is required to place the cover in position or remove it from the box. An opening 5 is provided in an end of the box adjacent the bottom for the entrance of the bees, the bottom being extended to provide a rest 6 for the bees to light upon preliminary to passing through the entrance 5 into the box. A bail 7 applied to the box serves as convenient means for suspending the trap in a tree or as carrying means therefor when transporting the trap from one place to another.

A plurality of frames 8 are attached to the underside of the cover 2 in a manner to be readily disconnected when transferring the bees from the trap to the hive. Screws 9 or like means are generally employed for detachably connecting the frames 8 to the cover and when making the transfer the screws or fastenings 9 are removed so that the cover 2 may be detached from the frames and the latter with the bees left in the hive, the cover of the latter replacing the cover of the trap which is removed to be applied to the box 1 when it is again required to use the trap. After the bees have entered the box, a door 10 is moved so as to close the inlet opening 5, thereby preventing the escape of the bees. The trap is transported to the apiary and the cover 2 is removed with the frames 8 attached thereto and containing the bees which collect thereon and the frames are introduced into a hive and are subsequently detached from the cover by removal of the fastenings 9, after which the cover of the hive replaces the cover 2 of the trap.

What is claimed is:

1. A bee trap comprising a box having an entrance for the bees, a cover detachably fitted to the top of the box and adapted to fit a hive and standard size hive frames detachably connected to the cover and held suspended in the box thereby whereby said top and frames may be unitarily moved from the trap and transferred to the hive and the cover thereafter detached from the frames.

2. A bee trap comprising a box having an entrance in the lower portion of the side and having a rest at the entrance for the bees to light upon, a cover detachably fitted to the top of the box and adapted to fit a hive, means for securing the cover against casual displacement, standard size hive frames detachably connected to the cover and suspended in the box thereby whereby said top and frames may be unitarily removed from the trap and transferred to the hive and the cover thereafter detached from the frames, a bail attached to the box, and a cover for closing the bee entrance.

In testimony whereof I affix my signature in presence of two witnesses.

WILLIAM L. STEVENS.

Witnesses:
H. D. CAMPBELL,
WM. H. CAMPBELL.